ns011424860B2

(12) United States Patent
Jiang et al.

(10) Patent No.: US 11,424,860 B2
(45) Date of Patent: Aug. 23, 2022

(54) SELECTION BETWEEN CODE TYPES FOR ENCODING INFORMATION BITS

(71) Applicants: QUALCOMM Incorporated, San Diego, CA (US); Jing Jiang, San Diego, CA (US); Yang Yang, San Diego, CA (US); Joseph Binamira Soriaga, San Diego, CA (US)

(72) Inventors: Jing Jiang, San Diego, CA (US); Yang Yang, San Diego, CA (US); Joseph Binamira Soriaga, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 5 days.

(21) Appl. No.: 16/617,475

(22) PCT Filed: Jun. 29, 2018

(86) PCT No.: PCT/CN2018/093813
§ 371 (c)(1),
(2) Date: Nov. 26, 2019

(87) PCT Pub. No.: WO2019/001581
PCT Pub. Date: Jan. 3, 2019

(65) Prior Publication Data
US 2020/0112396 A1   Apr. 9, 2020

Related U.S. Application Data

(63) Continuation-in-part of application No. PCT/CN2017/091006, filed on Jun. 30, 2017.

(30) Foreign Application Priority Data

Jun. 30, 2017   (WO) ................ PCT/CN2017/091006

(51) Int. Cl.
*H04L 1/00* (2006.01)
*H04W 76/27* (2018.01)
(Continued)

(52) U.S. Cl.
CPC .......... *H04L 1/0064* (2013.01); *H04L 1/0061* (2013.01); *H04L 41/06* (2013.01); *H04W 76/27* (2018.02)

(58) Field of Classification Search
CPC ... H04L 1/0064; H04L 1/0061; H04L 1/0017; H04L 1/0065; H04L 1/0041; H04L 1/0045; H04L 41/06; H04L 5/0053; H04W 76/27
See application file for complete search history.

(56) References Cited

U.S. PATENT DOCUMENTS 6,138,261 A    10/2000  Wilcoxson et al.
6,356,607 B1   3/2002   Scott et al.
(Continued)

FOREIGN PATENT DOCUMENTS

CN    101800901 A    8/2010
CN    102142928 A    8/2011
(Continued)

OTHER PUBLICATIONS

International Search Report and Written Opinion—PCT/CN2018/093813—ISA/EPO—dated Sep. 20, 2018.
(Continued)

*Primary Examiner* — Habte Mered
(74) *Attorney, Agent, or Firm* — Patterson+ Sheridan, L.L.P.

(57) ABSTRACT

Methods and apparatus are provided for selecting a code type. A type of code is selected from a set of code types to use as an inner code for a concatenated encoding scheme for encoding information bits of a channel, wherein the selec-
(Continued)

tion is based on one or more channel coding parameters including a false alarm detection objective for the channel. A codeword is generated by encoding the information bits using the type of codes selected as the inner code and an outer code. The generated codeword is transmitted.

30 Claims, 10 Drawing Sheets

(51) Int. Cl.
*H04L 12/24* (2006.01)
*H04L 41/06* (2022.01)

(56) References Cited

U.S. PATENT DOCUMENTS

| | | | |
|---|---|---|---|
| 7,580,469 | B2 | 8/2009 | Yonesi et al. |
| 10,917,112 | B2* | 2/2021 | Ge .................. H04L 1/0041 |
| 2003/0122697 | A1 | 7/2003 | Schooler et al. |
| 2009/0199069 | A1 | 8/2009 | Palanki et al. |
| 2010/0118795 | A1* | 5/2010 | Hassan .............. H04L 1/0009 |
| | | | 370/329 |
| 2011/0080880 | A1 | 4/2011 | Yin et al. |
| 2014/0153625 | A1 | 6/2014 | Vojcic et al. |
| 2016/0057776 | A1 | 2/2016 | Farkas et al. |
| 2016/0295633 | A1* | 10/2016 | Baligh ............... H04W 76/25 |
| 2019/0215099 | A1* | 7/2019 | Dai .................... H04L 1/0068 |
| 2019/0260392 | A1* | 8/2019 | Zhang ................ H04L 1/0061 |
| 2019/0349143 | A1* | 11/2019 | Su .................... H04W 72/042 |
| 2020/0028524 | A1* | 1/2020 | Huang ............... H03M 13/13 |

FOREIGN PATENT DOCUMENTS

| | | |
|---|---|---|
| CN | 102209956 A | 10/2011 |
| WO | 2006076527 A2 | 7/2006 |
| WO | WO-2017078796 A1 | 5/2017 |

OTHER PUBLICATIONS

International Search Report and Written Opinion—PCT/CN2017/091006—ISA/EPO—dated Mar. 28, 2018.
Nortel Networks: "Synchronization Channel with Cyclic Hierarchical Sequences in UTRA TDD," TSG-RAN Working Group 1 Meeting #7, TSGR1 #7(99) d42, Sep. 3, 1999, 22 Pages.
Huawei, et al., "Channel Coding for PBCH", 3GPP Draft, 3GPP TSG RAN WG1 Meeting #89, R1-1706969, Channel Coding for PBCH, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017, May 14, 2017 (May 14, 2017), XP051272199, 5 pages, Retrieved from the Internet: URL: http://www.3gpp.org/ftp/Meetings_3GPP_SYNC/RAN1/Docs/ [retrieved on May 14, 2017], Sections 2.1, 2.2.
Nokia, et al., "Short Block Codes for eMBB Control", 3GPP Draft, 3GPP TSG RAN WG1 #88bis Meeting, R1-1706528, Short Block Control Coding, 3rd Generation Partnership Project (3GPP), Mobile Competence Centre, 650, Route Des Lucioles, F-06921, Sophia-Antipolis Cedex, France, vol. RAN WG1, No. Spokane, Washington, USA, Apr. 3, 2017-Apr. 7, 2017, Apr. 9, 2017 (Apr. 9, 2017), XP051252759, 12 pages, Retrieved from the Internet: URL: http://vww.3gpp.org/ftp/tsg_ran/WG1_RL1/TSGR1_88b/Docs/ [retrieved on Apr. 9, 2017], Section 3.
Supplementary European Search Report—EP18824762—Search Authority—Munich—dated Feb. 18, 2021.
Huawei, et al., "Evaluation of Channel Coding Schemes for Control Channel", 3GPP TSG RAN WG1 Meeting #86b, R1-1608863, vol. RAN WG1, No. Lisbon, Portugal, Oct. 10-14, 2016, (Oct. 1, 2016), 9 pages.
Taiwan Search Report—TW107122539—TIPO—dated Dec. 17, 2021.
Mediatek Inc: "Channel Coding for NR-PBCH", 3GPP TSG RAN WG1 #89 Meeting, R1-1707846, Hangzhou, China, May 15-19, 2017, 10 Pages.
NTT Docomo: "Distributed Simple Parity Check Polar Codes" [online], 3GPP Draft, 3GPP TSG RAN WG1 Meeting #89, R1-1708488, Hangzhou, China 15th. 191h May 2017, May 6, 2017, 9 Pages, Retrieved from the Internet: URL: http://www.3gpp.org/ftp/tsg_ran/WG1_RL1/TSGR1_89/Docs/R1-1708488.zip.
Qualcomm Incorporated: "Control Channel Performance", 3GPP Draft, 3GPP TSG-RAN WG1 #87, R1-1613085, Control Channel Performance, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 19, 2016 (Nov. 19, 2016), XP051190976, 11 Pages. Retrieved from the Internet: URL: http://www.3gpp.org/ftp/tsg_ran/WG1_RL1/TSGR1_87/Docs/ [retrieved on Nov. 20, 2020], p. 1, pp. 3, 4, p. 5, line 1-line 3.
ZTE: "Results of HS-DPCCH Power Offsets for 4C-HSDPA", 3GPP TSG RAN WG1 Meeting #62, R1-104568, Madrid, Spain, Aug. 23-27, 2010, Aug. 17, 2010, pp. 1-15.

* cited by examiner

SELECTION BETWEEN CODE TYPES FOR ENCODING INFORMATION BITS

CLAIM OF PRIORITY

The present Application for Patent is a national stage application under 35 U.S.C. 371 of PCT/CN2018/093813, filed Jun. 29, 2018, which claims benefit of Patent Application Serial No. PCT/CN2017/091006, filed Jun. 30, 2017, which are both assigned to the assignee hereof and hereby expressly incorporated by reference herein in their entireties.

FIELD

The present disclosure relates generally to wireless communication systems, and more particularly, to methods and apparatus for selecting between code types for encoding information bits.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications. The method generally includes selecting, from a set of code types, a type of code to use as an inner code for a concatenated coding scheme for encoding information bits of a channel, wherein the selection is based on a false alarm detection objective for the channel; generating a codeword by encoding the information bits using the type of code selected as the inner code and an outer code; and transmitting the codeword.

Certain aspects of the present disclosure provide an apparatus for wireless communications. The apparatus generally includes means for selecting, from a set of code types, a type of code to use as an inner code for a concatenated coding scheme for encoding information bits of a channel, wherein the selection is based on a false alarm detection objective for the channel; means for generating a codeword by encoding the information bits using the type of code selected as the inner code and an outer code; and means for transmitting the codeword.

Certain aspects of the present disclosure provide an apparatus for wireless communications. The apparatus generally includes at least one processor and a memory coupled to the at least one processor. The at least one processor is generally configured to select, from a set of code types, a type of code to use as an inner code for a concatenated coding scheme for encoding information bits of a channel, wherein the selection is based on a false alarm detection objective for the channel; generate a codeword by encoding the information bits using the type of code selected as the inner code and an outer code; and transmit the codeword.

Certain aspects of the present disclosure provide a computer-readable medium for wireless communications. The computer-readable medium storing instructions which when executed by at least one processor perform a method including selecting, from a set of code types, a type of code to use as an inner code for a concatenated coding scheme for encoding information bits of a channel, wherein the selection is based on a false alarm detection objective for the channel; generating a codeword by encoding the information bits using the type of code selected as the inner code and an outer code; and transmitting the codeword.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
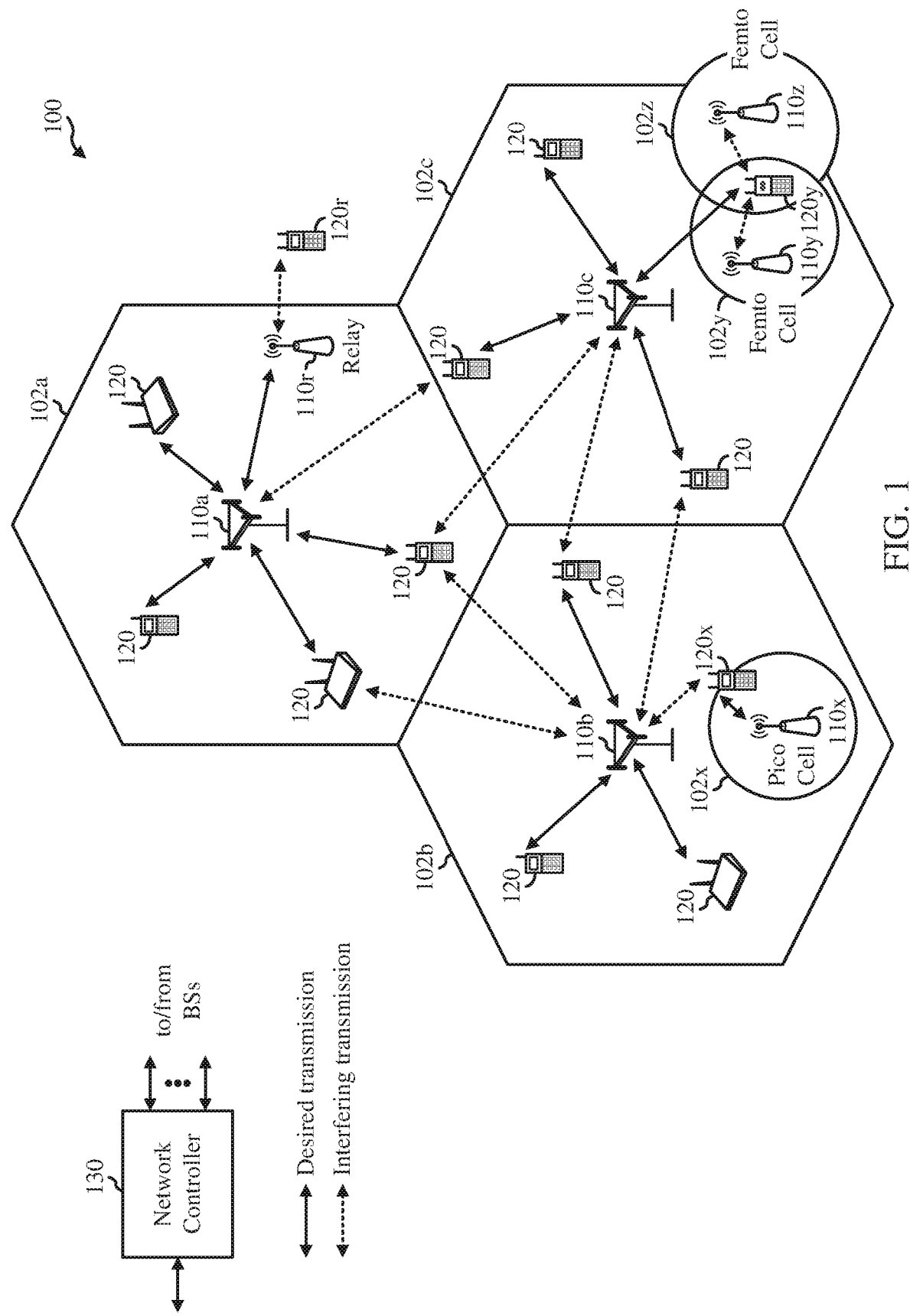
FIG. 1 is a block diagram conceptually illustrating an example telecommunications system, in accordance with certain aspects of the present disclosure.

In coding theory, concatenated codes form a class of error correcting codes that are derived by combining an inner code and an outer code. The inner code and outer codes are generally used in concatenation to form a stronger combined code.

In certain aspects, different channel coding schemes have different performance in different information-bit length (K) region. In general if K is very small (e.g., <12 bits), then Reed Muller (RM) code may perform better than Polar code. On the other hand if K is large, then Polar code may outperform RM code under comparable decoding complexity requirements.

Thus, in certain aspects, it may be beneficial to select a coding scheme (e.g., RM code or Polar code) based at least one the number of information bits to be decoded. Further, the selection between RM and Polar code, in addition to the information bit length (K), may need to take into account certain other parameter as well which are discussed in more detail below.

Certain aspects, of the present disclosure discuss techniques for selecting between RM code and Polar code for encoding/decoding information bits based on one or more channel coding parameters.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE. CDMA. TDMA, FDMA. OFDMA, SC-FDMA and other networks.

The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000. IS-95 and IS-856 standards. A TDMA network may implement a radio technology such as Global System for Mobile Communications (GSM). An OFDMA network may implement a radio technology such as NR (e.g. 5G RA). Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x. 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B. Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
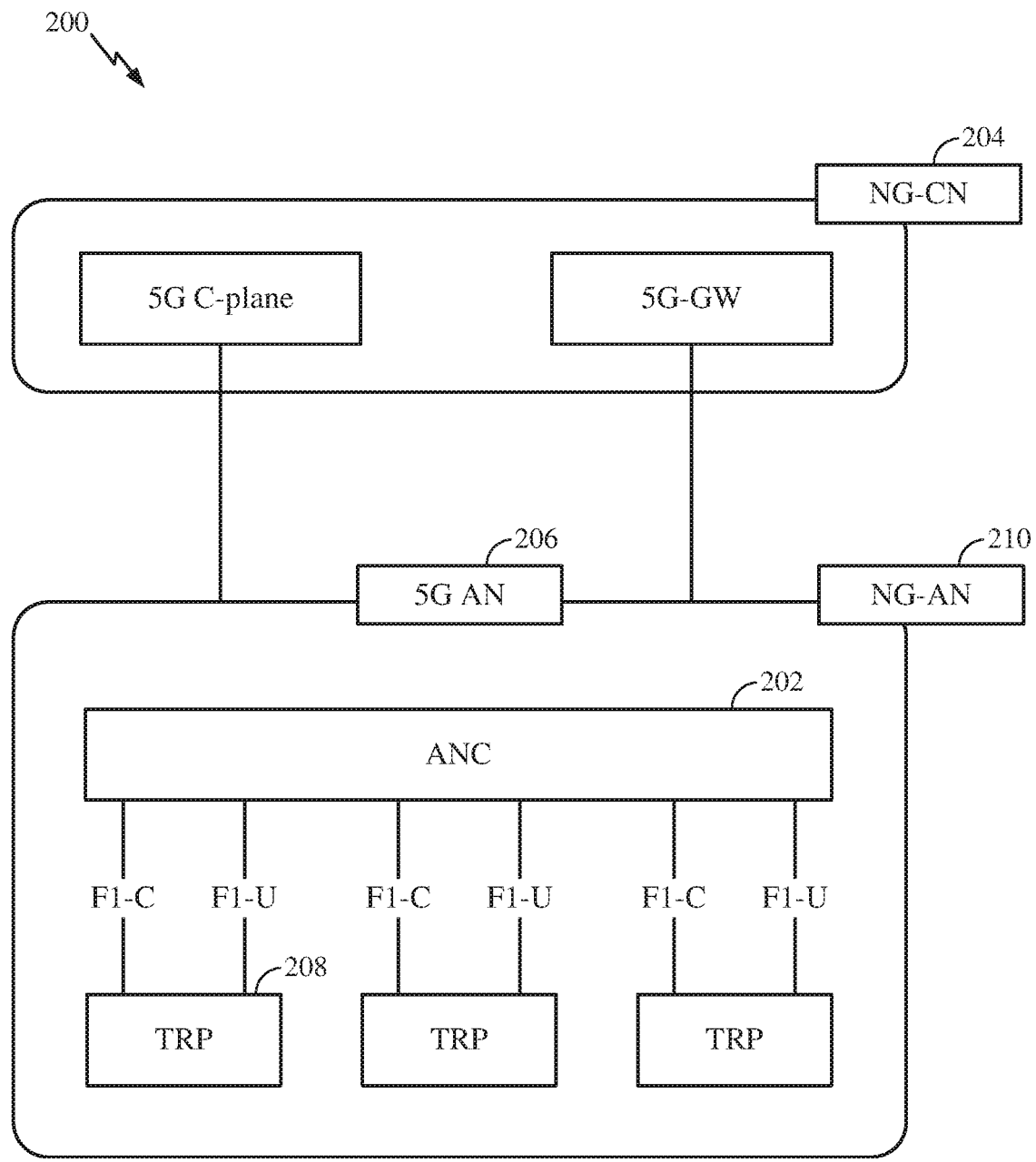
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
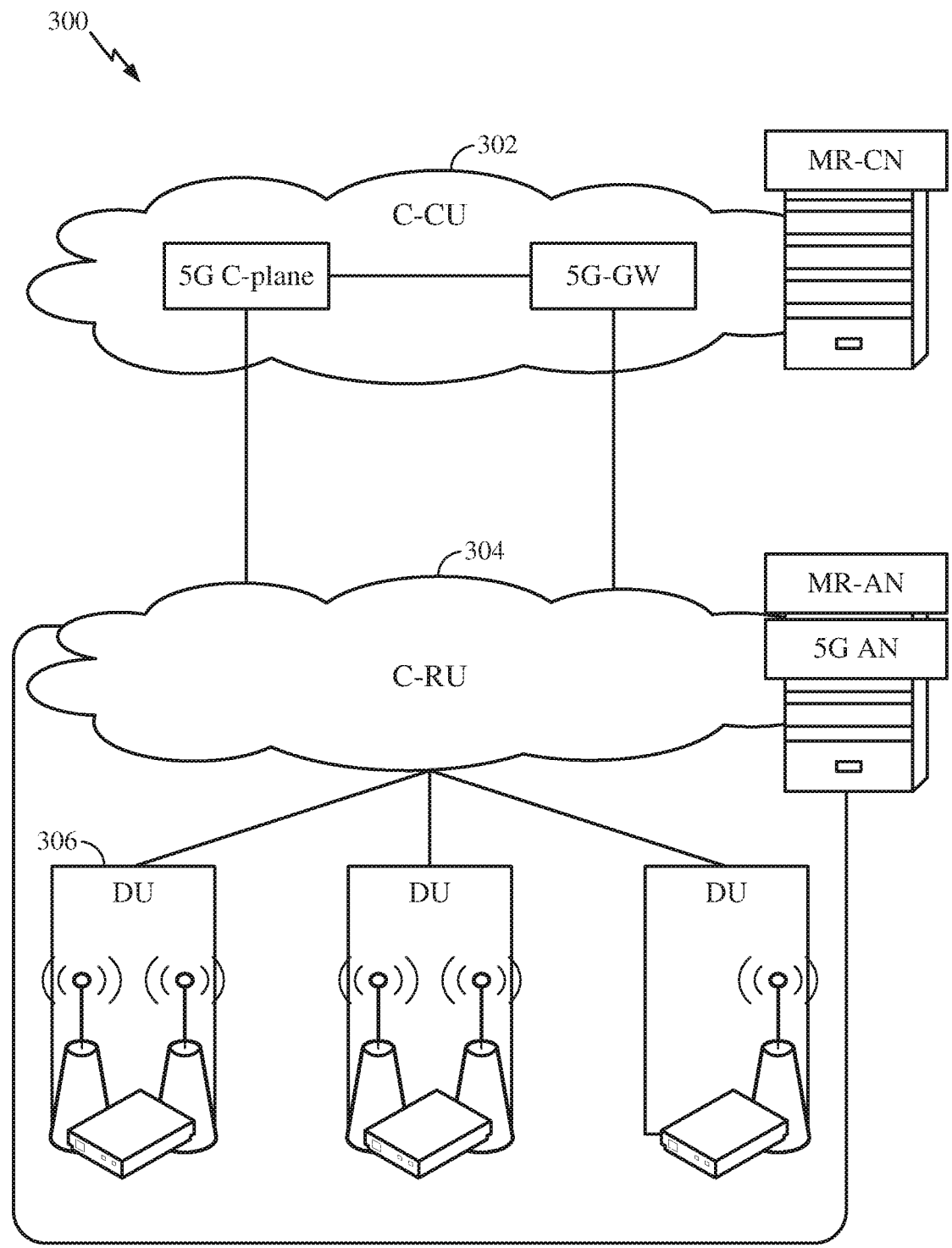
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
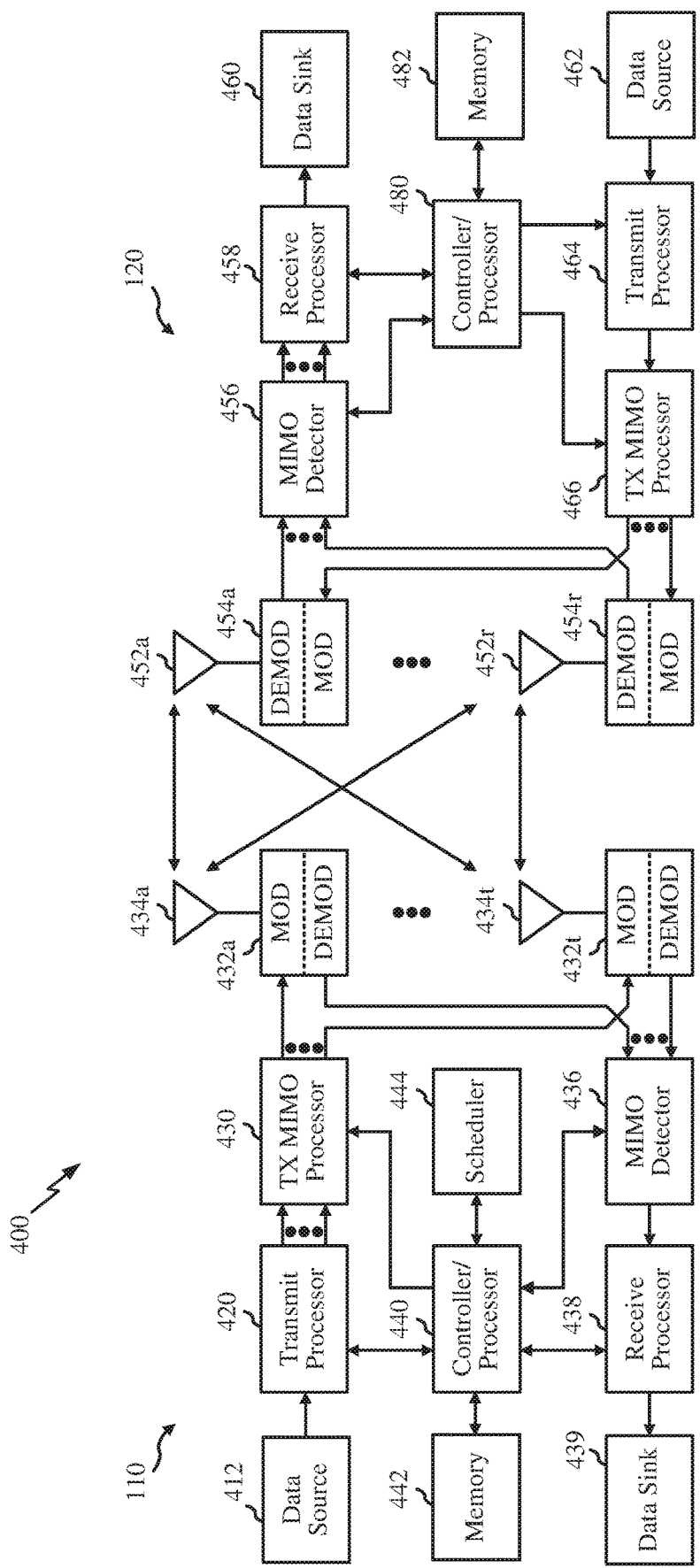
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH). Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS. SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases. CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
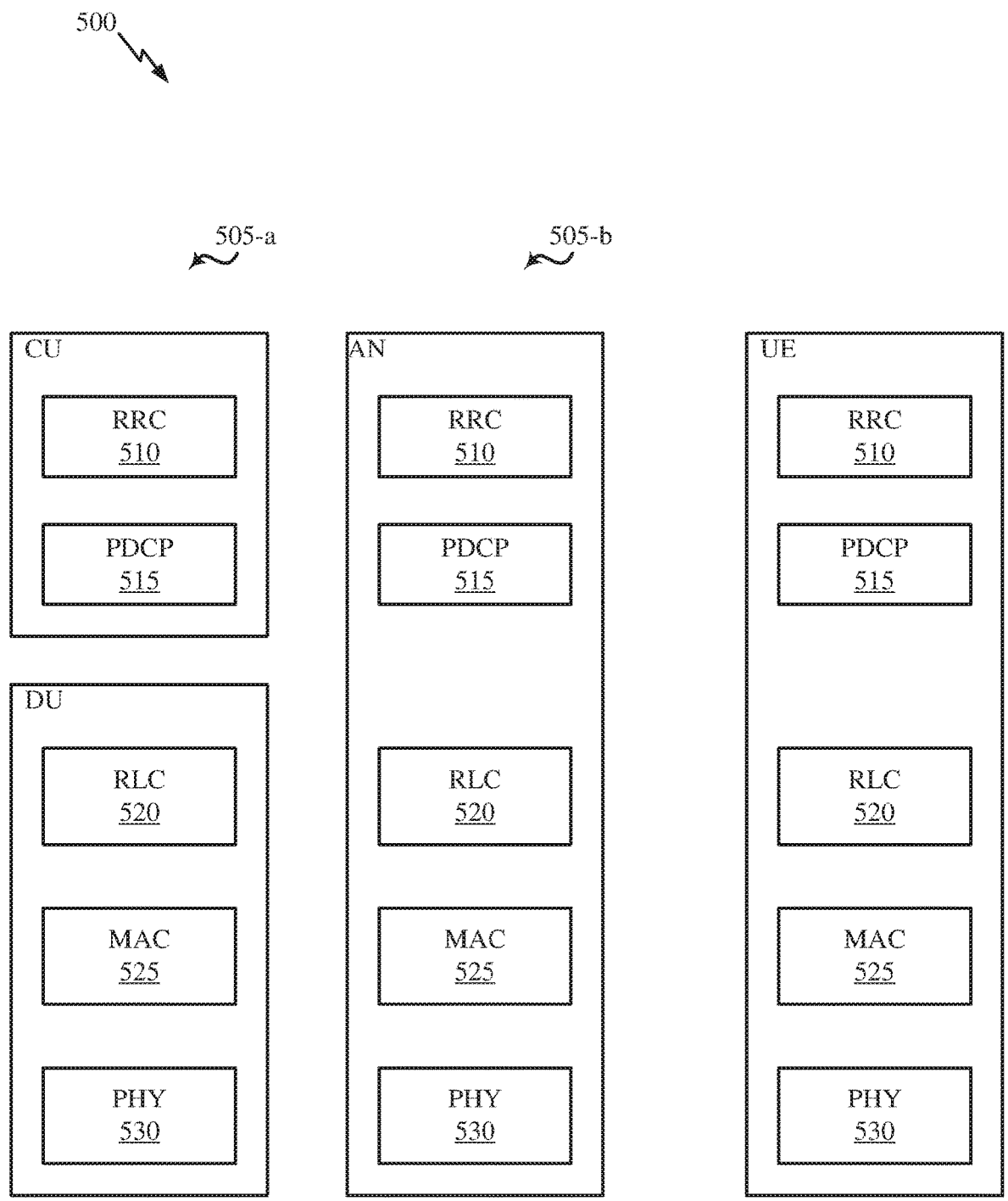
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
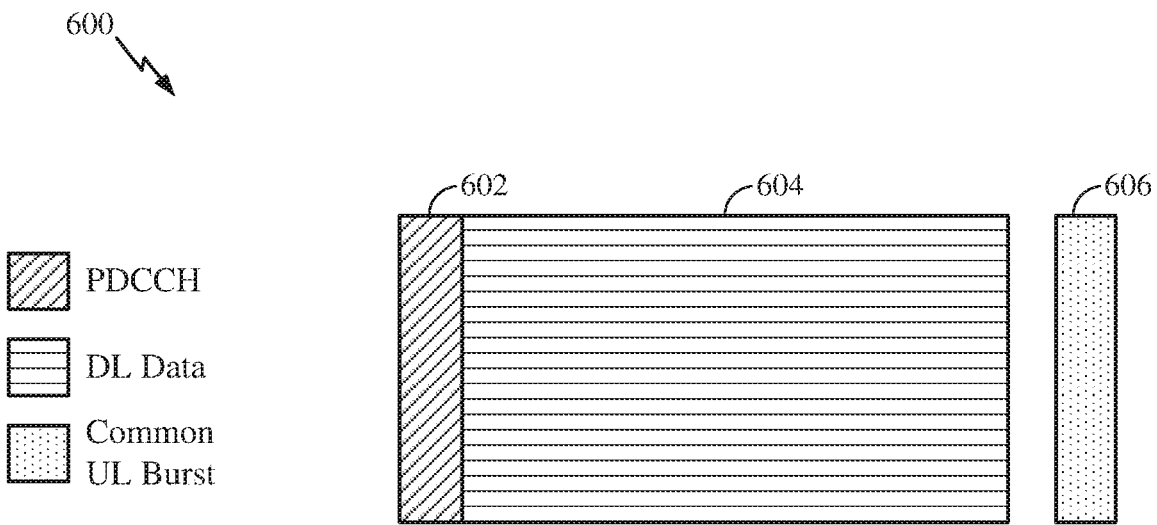
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
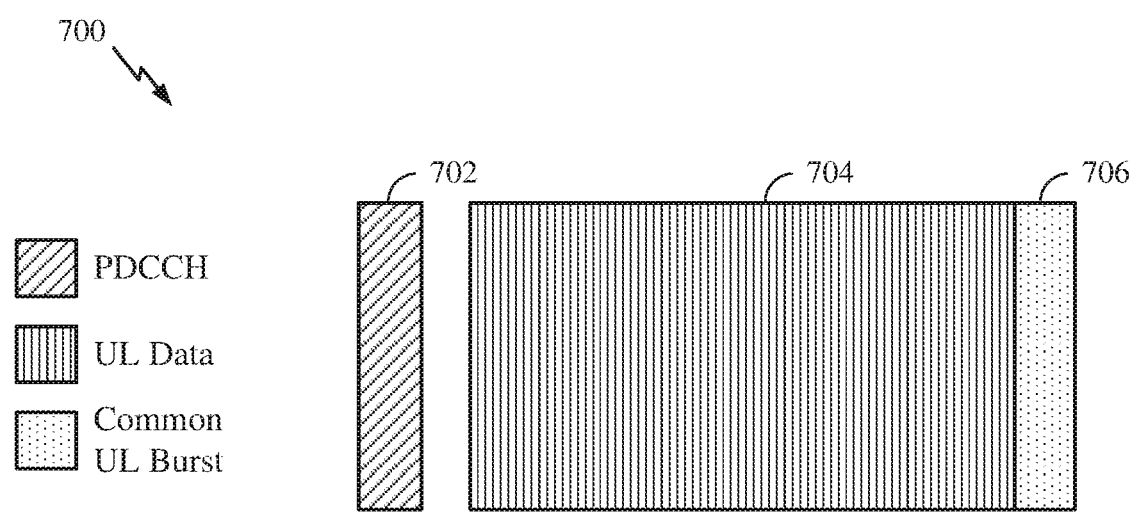
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Selection Between Code Types for Encoding Information Bits

In coding theory, concatenated codes form a class of error correcting codes that are derived by combining an inner code and an outer code to form a stronger more reliable code. The inner and outer codes are generally used in concatenation to form a stronger combined code. Information bits may be first encoded using the outer code and then the encoded information bits may again be encoded using the inner code. Operations at a receiver for decoding the encoded bits are generally in the reverse order. For example, at the receiver, the decoding of the inner coding is performed first followed by decoding the outer coding. In certain aspects, the outer code may be any error detection code, erasure code, or any error correction code. The outer code may include parity bit(s) J for false alarm detection. An example of outer code is Cyclic Redundancy Check (CRC) code. The inner code may be any error correction code. The inner code may include assistant parity bit(s) J' in order to improve decoding performance of the inner code.

Figure 8:
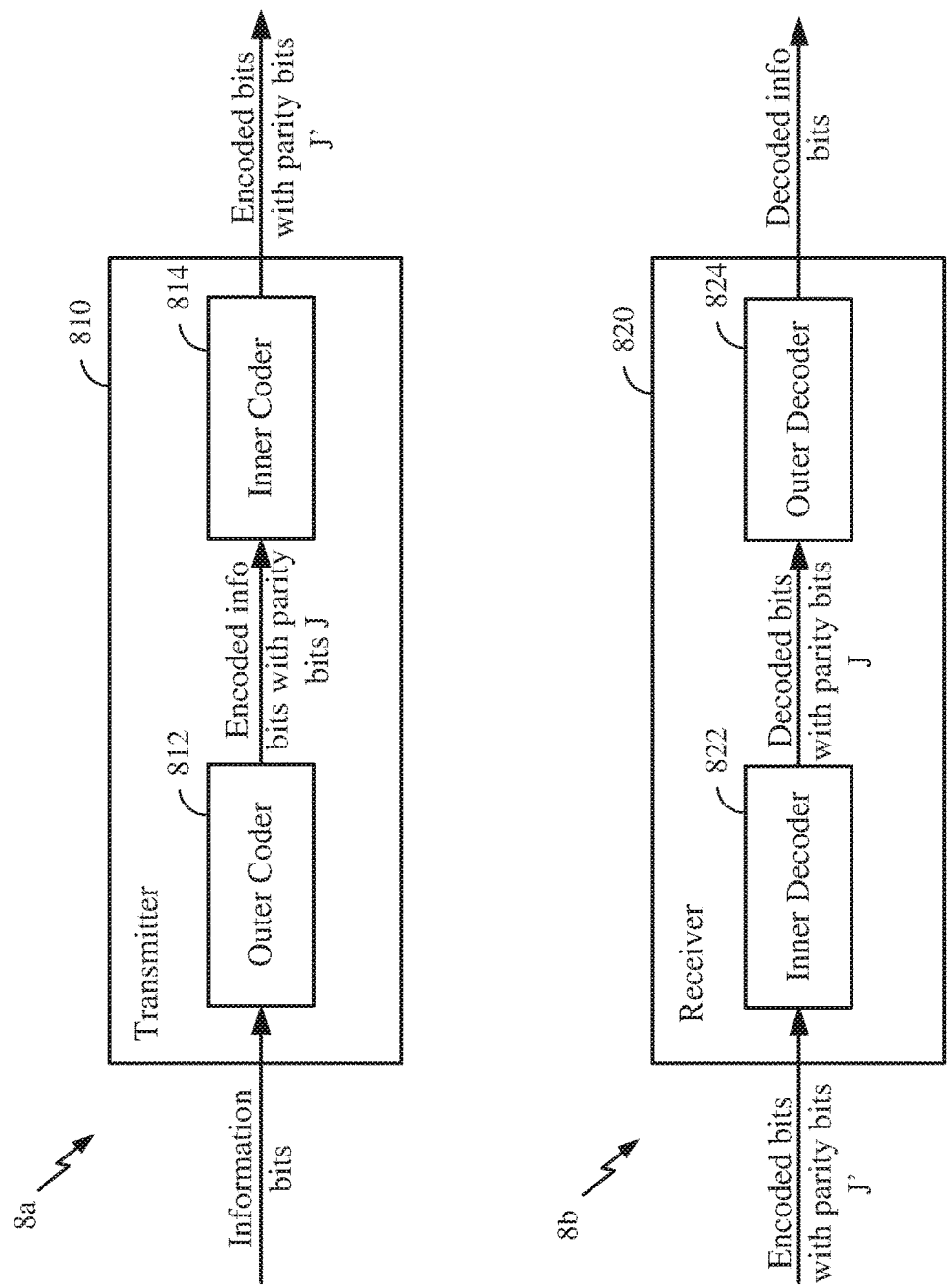
FIG. 8 illustrates encoding and decoding using a concatenated code, in accordance with certain aspects of the present disclosure.

FIG. 8 illustrates encoding and decoding using a concatenated code, in accordance with certain aspects of the present disclosure. 8a shows an encoding operation at a transmitter device 810 (e.g., gNB or UE). As shown, the transmitter 810 includes an outer coder 812 and an inner coder 814. Information bits are first encoded by the outer coder 812 based on an outer code to output partially encoded information bits including parity bits (J). The encoded bits including parity bits (J) is then encoded again by the inner coder 814 using an inner code to output encoded bits including assistant parity bits (J'). The encoded bits including the assistant parity bits (J') are transmitted by the transmitter 810.

8b shows a decoding operation by a receiver 820 corresponding to the encoding operation of 8a. As shown, the receiver 820 includes an inner decoder 822 and an outer decoder 824. The receiver 820 receives the encoded bits from the transmitter 810. The received encoded bits are first decoded by an inner decoder 822 using the same inner code used by the transmitter 810 to output partially decoded bits including parity bits (J). The partially decoded bits are then further decoded by the outer decoder 824 using the same outer code used the transmitter 810 to recover the information bits.

In certain aspects, a false alarm is a situation when an erroneously decoded code word is indicated as a valid code word, for example, by a Cyclic Redundancy Check (CRC) code. The outer code parity bit length J dictates false alarm detection accuracy, for example, how accurate is the false alarm detection. A longer parity bit length J generally translates to a lower false alarm rate (FAR). In an aspect, the outer code parity bit length J is determined by a false alarm rate (FAR) requirement. A lower (e.g., more stringent) FAR requirement generally requires more outer code parity bits J.

In certain aspects if a CRC code (or any effective error detection code) with J parity bits is used as the outer code, then the false alarm rate may be $2^{\{-J\}}$ when no list-decoding (e.g., list size=1) is used for the inner code. No list-decoding is generally when the decoder does not have more than one candidate for decoding a code word. In certain aspects, if the inner code uses a list size L, then the final false alarm rate may be $2^{\{-J+\log 2(\text{list\_size}, L)\}}$, which is higher as compared to no list-decoding. A higher false alarm rate is not desirable. However, it is generally a tradeoff between having more error detection bits and more decoding candidates. Larger the list better is the decoding performance at the receiver. But a larger list adversely affects false alarm detection in terms of the ability of the receiver to detect errors in decoding.

In certain aspects, different channel coding schemes perform differently in different information-bit length (K) region. In general if K is very small (e.g., <12 bits), then Reed Muller (RM) code may perform better than Polar code. On the other hand if K is large, then Polar code may outperform RM code under comparable decoding complexity requirements.

Thus, in certain aspects, it may be beneficial to select a coding scheme (e.g., RM code or Polar code) based at least on the number of information bits to be decoded. Further, the selection between RM and Polar code, in addition to the information bit length (K), may need to take into account certain other parameters as well which are discussed in more detail below.

Certain aspects, of the present disclosure discuss techniques for selecting between RM code and Polar code for encoding/decoding information bits based on one or more channel coding parameters.

Figure 9:
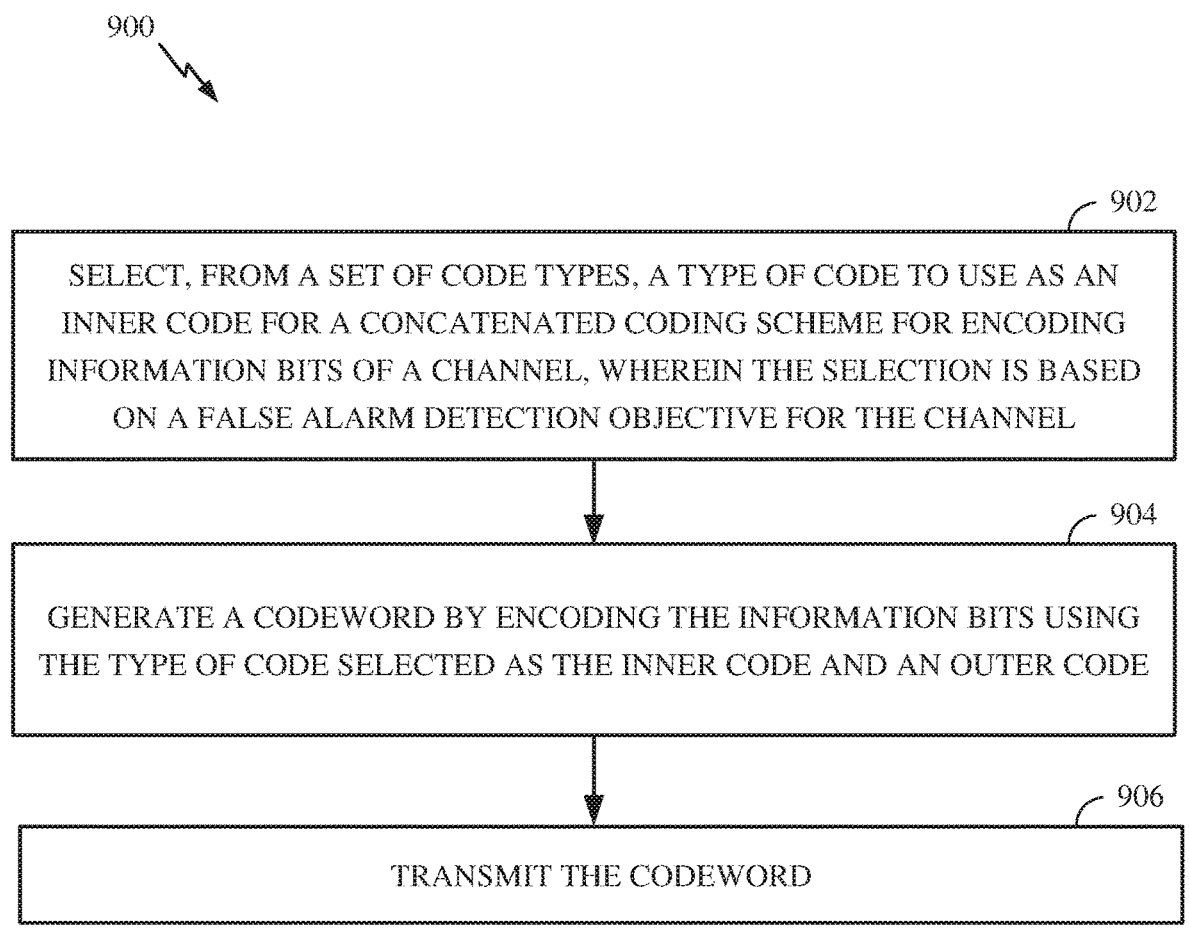
FIG. 9 illustrates example operations 900 that may be performed by a wireless device (e.g., a UE or a gNB) for selecting a code type for encoding information bits, in accordance with certain aspects of the present disclosure.

FIG. 9 illustrates example operations 900 that may be performed by a wireless device (e.g., a UE or a gNB) for selecting a code type for coding information bits, in accordance with certain aspects of the present disclosure. Operations 900 begin, at 902, by selecting, from a set of code types, a type of code to use as an inner code for a concatenated encoding scheme for encoding information bits of a channel, wherein the selection is based on a false alarm detection objective for the channel. At 904, the wireless device generates a code word by encoding the information bits using the type of code selected as the inner code and an outer code. At 906, the wireless device transmits the code word.

In certain aspects the set of code types includes at least one or more RM codes and one or more Polar codes. In certain aspects, the selection between RM code and Polar code may be performed further based on additional parameters including information bit length (K), number of assistant parity bits J' to be included as part of the inner code, outer code parity bit length J, and list size L to be used in a list-decoding algorithm at the receiver. In an aspect, the outer code parity bit length J and the list size L together determine the false alarm rate (FAR). As noted above, the FAR for list-decoding may be 2^{−J+log 2(list_size, L)}.

In certain aspects, a metric may be generated as a function of one or more of the above discussed parameters, and the selection between RM code and Polar code may be performed based on the metric. In an aspect, the metric may be a function of the information bit length (K), FAR requirement (P_{fa}) where {fa} stands for false alarm, and decoding list requirement L, and the selection between RM code and polar code may follow a threshold decision based on this metric.

In an example scenario, the metric as a function of K, (P_{fa}), and L may be K+log 2(1/P_{fa})+log 2(L). In an aspect, if K+log 2(1/P_{fa})+log 2(L) is above a threshold, then Polar code is selected as the inner code and the outer code parity bits J is set as log 2(1/P_{fa})+log 2(L) parity bits. On the other hand if K+log 2(1/P_{fa})+log 2(L) is below a threshold, then RM code is selected as the inner code and the outer code parity bits J is set as log 2(1/P_{fa})+log 2(L) parity bits.

In certain aspects, a budget (e.g., number of bits) is generally assigned for J+J' overhead bits. Thus, if J is small (or 0) indicating a less stringent or no false alarm requirement, then additional assistant parity bits J' may be used to increase decoding performance. For example, if J is below a threshold, then J' may be set to 3. On the other hand, if J is above a threshold, then J' may be set to 0.

In certain aspects, the false alarm requirement may be determined by a device (e.g., a receiver) in a number of ways.

In an aspect, the false alarm requirement may be implicit in the specification (e.g., 3$^{rd}$ Generation Partnership Project, 3GPP specification). For example, the specification may specify a number of hypotheses a device must check (e.g., during blind decoding) to decode a channel/message. The device may implicitly derive the false alarm requirement based on this information. Generally, more are the number of hypotheses the device must check, higher is the false alarm requirement as the probability of error is larger.

In an aspect, the false alarm requirement may be explicitly signaled to the device, for example via RRC signaling. For example, a gNB may signal to a UE what false alarm requirement is to be used for each channel. The UE may perform decoding on the channel based on the received signaling and one or more rules discussed above.

In an aspect, the false alarm requirement may depend on a type of channel being encoded/decoded. Different channels may have different false alarm requirements. For example, for certain channels (e.g., PDCCH) a receiving device may need to check several hypotheses to decode the channel and may need to determine if a decoded code word is valid in each of the hypotheses. This generally translates to a higher false alarm (lower more stringent false alarm rate) requirement. However, for certain channels (e.g., PUCCH), the gNB may indicate to the receiving device (e.g., UE) where to look for the channel. This generally translates to a low false alarm requirement. In an aspect, a Group Common (GC)-PDCCH has a long CRC and a higher FAR requirement, a regular PDCCH has a long CRC and a lower FAR requirement, UCI on PUCCH has a short CRC and a lower FAR requirement, and UCI on PUSCH has a long CRC and has a higher FAR requirement.

In an aspect, the false alarm requirement may depend on a number of retransmissions. For example, the requirement may be increased for a re-transmission and the requirement may be higher for a higher number of re-transmissions.

In certain aspects, based on the determined false alarm requirement, a device may determine a value of J and use it for decoding transmissions. For example, the device may decide to use RM or Polar decoding for a particular channel/message. In an aspect, where the outer code includes a CRC, the number of parity bits J of the CRC may depend on the false alarm requirement.

Figure 10:
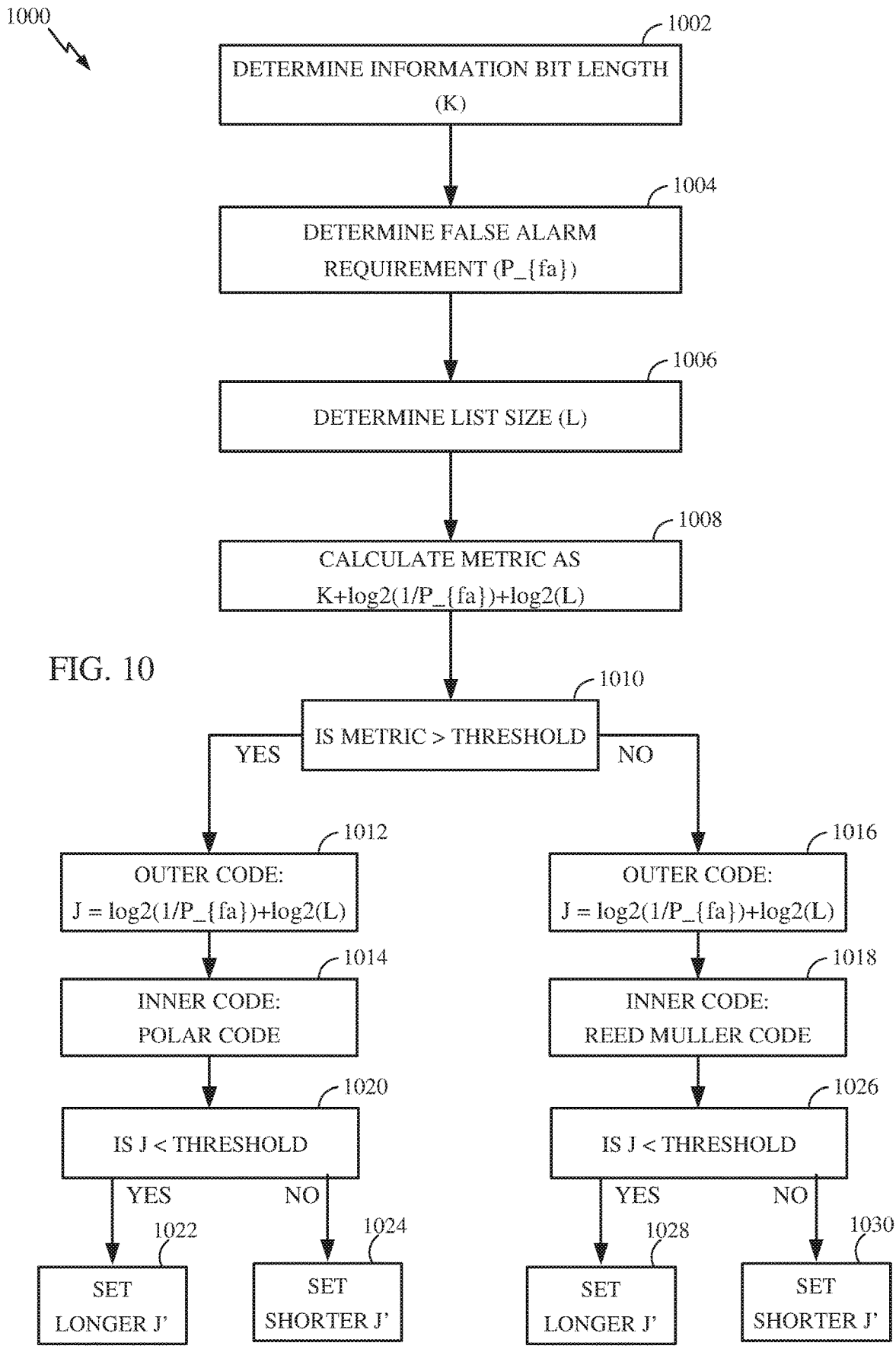
FIG. 10 illustrates a decision tree 1000 for determining a concatenated code for encoding information bits by a wireless device (e.g., gNB or UE), in accordance with certain aspects of the present disclosure.

FIG. 10 illustrates a decision tree 1000 for determining a concatenated code for encoding information bits by a wireless device (e.g., gNB or UE), in accordance with certain aspects of the present disclosure.

The decision tree 1000 begins, at 1002, by determining a length (L) of information bits that are to be transmitted by the device. At 1004, the device determines a false alarm requirement (P_{fa}). As noted above. The false alarm requirement (P_{fa}) may be determined by the device in a number of ways. At 1006, the device determines a list size (L) for the transmission. At 1008, the device calculates a metric as a function of K, (P_{fa}), and L given by K+log 2(1/P_{fa})+log 2(L).

In an aspect, an outer code and an inner code are determined based on the calculated metric. At 1010, the metric is compared to a threshold value. If the metric is greater than a threshold, the outer code parity bits J is set at 1012 as log 2(1/P_{fa}+log 2(L) parity bits and Polar code is selected at 1014 as the inner code. Once the outer and inner codes are determined, the assistant parity bits (J') is set based on the determined parity bits (J). At 1020, the device compares the determined parity bits (J) with a threshold value of J. If J is less than the threshold, a longer J' is selected at 1022. On the other hand, if J is greater than the threshold a shorter value of J' is selected at 1024. In an aspect, as described above, a budget is assigned for J+J' overhead bits and J' may be assigned based on the assigned budget for J+J'.

Alternatively, if the UE determines at 1010 that the metric is below the threshold, the outer code parity bits J is set at 1016 as log 2(1/P_{fa}+log 2(L) parity bits and Reed Muller code is selected at 1018 as the inner code. The assistant parity bits J' are selected similar to the case noted above when the metric is greater than the threshold. For example, at 1026, the device compares the determined parity bits (J) with a threshold value of J. If J is less than the threshold, a longer J' is selected at 1028. On the other hand, if J is greater than the threshold a shorter value of J' is selected at 1030.

In an example scenario, for UL, if K<=12, if there is no FAR requirement and number of CRC bits=0, then RM code is chosen.

However, if K<=12, but there is an FAR requirement, that is number of CRC bits for error detection (J>threshold, where threshold can be 0), then either CRC Aided (CA)-polar or CA-parity check (PC) polar (or possibly could be PC polar) is chosen. Different types of polar codes may be selected based on the FAR requirement.

Similarly, for an example case when 12<=K<=22, if there is no FAR requirement and number of CRC bits=0, CA-PC polar (or possibly pure PC polar) is used with J'=6 assistant bits (could be 3 CRC bits and 3 PC bits). However, if there is an FAR requirement, that is number of CRC bits for error detection !=0, (5-bit-8-bit CRC for example), then CA-polar may be used as opposed to CA-PC.

In certain aspects, for K<=12, for DL PDCCH, FAR needs to be guaranteed for regular PDCCH (unlike GC-PDCCH). In this case, even for very small DCI payload (e.g., K<=12), good FAR is needed and hence, some CRC bits are needed. Thus, in this case, if nFAR=16, polar code is needed.

Figure 11:
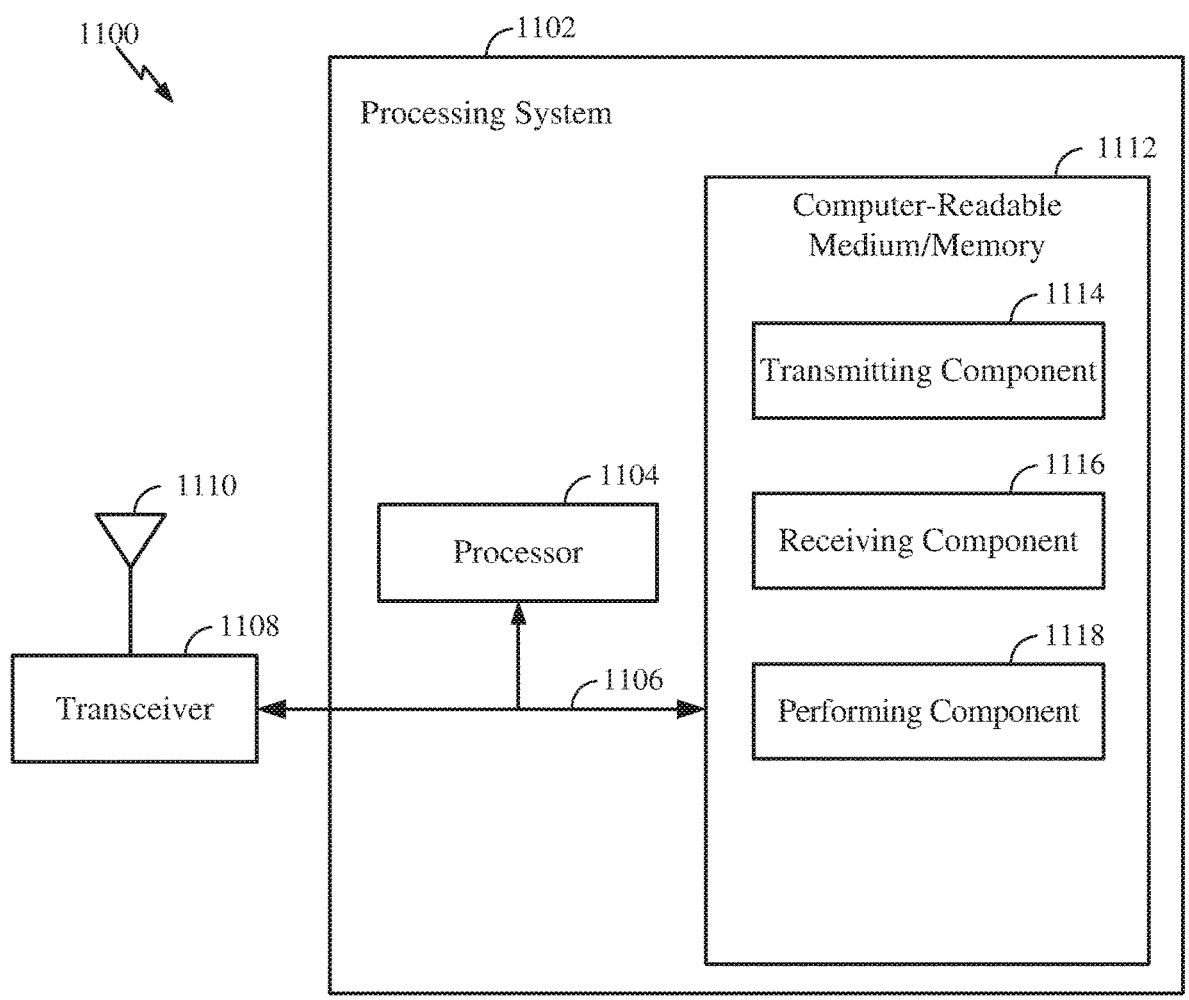
FIG. 11 illustrates a communications device that may include various components configured to perform operations for the techniques disclosed herein, such as the operations illustrated in FIG. 9, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIG. 9, or other operations for performing the various techniques discussed herein.

In certain aspects, the computer-readable medium/memory 1112 includes a selecting component 1114 to cause the processor to perform the selecting operation illustrated in FIG. 9. Additionally, the computer-readable medium/memory 1112 includes a generating component 1116 to cause the processor 1104 to perform the generating operation illustrated in FIG. 9. Additionally, the computer-readable medium/memory 1112 includes a transmitting component 1118 for causing the processor 1104 to perform the transmitting operation illustrated in FIG. 9. The selecting component 1114, generating component 1116, and transmitting component 1118 may be coupled to the processor 1104 via bus 1106. In certain aspects, the selecting component 1114, generating component 1116, and transmitting component 1118 may be hardware circuits. In certain aspects, the selecting component 1114, generating component 1116, and transmitting component 1118 may be software components that are executed and run on processor 1104.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for selecting and means for generating, may comprise one or more processors, such as the controller/processor 480 of the user equipment 120, or the controller/processor 440 of the base station 110.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory). PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications, comprising:
selecting, from a set of code types, a type of code to use as an inner code for a concatenated coding scheme for encoding information bits of a channel, wherein the selection is based on a false alarm detection objective for the channel;
generating a codeword by encoding the information bits using the type of code selected as the inner code and an outer code; and
transmitting the codeword.

2. The method of claim 1, wherein the outer code comprises a cyclic redundancy check (CRC), wherein a number of bits for the CRC is based on the false alarm detection objective for the channel.

3. The method of claim 1, wherein the false alarm detection objective depends on a type of the physical channel.

4. The method of claim 1, wherein the false alarm detection objective depends on a number of retransmissions of the channel.

5. The method of claim 1, wherein information regarding the false alarm detection objective is signaled via radio resource control (RRC) signaling.

6. The method of claim 1, wherein the set of code types comprises at least a Reed-Muller code type and a polar code type.

7. The method of claim 1, wherein selecting comprises selecting further based on at least one of a number of information bits of the channel to be encoded, or a list decoding size.

8. The method of claim 7, further comprising:
generating a metric as a function of the number of information bits, the false alarm detection objective, and the list decoding size; and
selecting the type of code based on the metric.

9. The method of claim 8, wherein the selecting comprises:
selecting a polar code type if the metric is equal to or exceeds a threshold value; or
selecting a Reed-Muller code type if the metric is below the threshold value.

10. The method of claim 1, further comprising determining a number of assistant parity bits to use for the inner code in the concatenated coding scheme based, at least in part, on a code parity bit length of the outer code.

11. An apparatus for wireless communications, comprising:
means for selecting, from a set of code types, a type of code to use as an inner code for a concatenated coding scheme for encoding information bits of a channel, wherein the selection is based on a false alarm detection objective for the channel;
means for generating a codeword by encoding the information bits using the type of code selected as the inner code and an outer code; and
means for transmitting the codeword.

12. The apparatus of claim 11, wherein the outer code comprises a cyclic redundancy check (CRC), wherein a number of bits for the CRC is based on the false alarm detection objective for the channel.

13. The apparatus of claim 11, wherein the false alarm detection objective depends on a type of the physical channel.

14. The apparatus of claim 11, wherein the false alarm detection objective depends on a number of retransmissions of the channel.

15. The apparatus of claim 11, wherein information regarding the false alarm detection objective is signaled via radio resource control (RRC) signaling.

16. The apparatus of claim 11, wherein the set of code types comprises at least a Reed-Muller code type and a polar code type.

17. The apparatus of claim 11, wherein the wherein the means for selecting selects further based on at least one of a number of information bits of the channel to be encoded, or a list decoding size.

18. The apparatus of claim 17, further comprising:
means for generating a metric as a function of the number of information bits, the false alarm detection objective, and the list decoding size; and
means for selecting the type of code based on the metric.

19. The apparatus of claim 18, wherein the means for selecting selects the type of code by:
selecting a polar code type if the metric is equal to or exceeds a threshold value; or
selecting a Reed-Muller code type if the metric is below the threshold value.

20. An apparatus of wireless communications, comprising:
at least one processor configured to:
select, from a set of code types, a type of code to use as an inner code for a concatenated coding scheme for encoding information bits of a channel, wherein the selection is based on a false alarm detection objective for the channel;
generate a codeword by encoding the information bits using the type of code selected as the inner code and an outer code; and
transmit the codeword; and
a memory coupled to the at least one processor.

21. The apparatus of claim 20, wherein the outer code comprises a cyclic redundancy check (CRC), wherein a number of bits for the CRC is based on the false alarm detection objective for the channel.

22. The apparatus of claim 20, wherein the false alarm detection objective depends on a type of the physical channel.

23. The apparatus of claim 20, wherein the false alarm detection objective depends on a number of retransmissions of the channel.

24. The apparatus of claim 20, wherein information regarding the false alarm detection objective is signaled via radio resource control (RRC) signaling.

25. The apparatus of claim 20, wherein the set of code types comprises at least a Reed-Muller code type and a polar code type.

26. The apparatus of claim 20, wherein the at least one processor is configured to select the type of code further based on at least one of a number of information bits of the channel to be encoded, or a list decoding size.

27. The apparatus of claim 26, wherein the at least one processor is further configured to:
generate a metric as a function of the number of information bits, the false alarm detection objective, and the list decoding size; and
select the type of code based on the metric.

28. The apparatus of claim 27, wherein the at least one processor is configured to select the type of code by:
selecting a polar code type if the metric is equal to or exceeds a threshold value; or
selecting a Reed-Muller code type if the metric is below the threshold value.

29. A non-transitory computer-readable medium for wireless communications, for storing instructions which when executed by at least one processor performs a method comprising:
selecting, from a set of code types, a type of code to use as an inner code for a concatenated coding scheme for encoding information bits of a channel, wherein the selection is based on a false alarm detection objective for the channel;

generating a codeword by encoding the information bits using the type of code selected as the inner code and an outer code; and transmitting the codeword.

30. The non-transitory computer-readable medium of claim 29, wherein the outer code comprises a cyclic redundancy check (CRC), wherein a number of bits for the CRC is based on the false alarm detection objective for the channel.

* * * * *